United States Patent
Jamison et al.

(10) Patent No.: US 11,298,753 B2
(45) Date of Patent: Apr. 12, 2022

(54) BULKHEAD PENETRATIONS IN HAZARDOUS ENVIRONMENTS

(71) Applicant: Halliburton Energy Services, Inc., Houston, TX (US)

(72) Inventors: Dale E. Jamison, Humble, TX (US); Andrew David Vos, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 115 days.

(21) Appl. No.: 16/559,525

(22) Filed: Sep. 3, 2019

(65) Prior Publication Data
US 2021/0060659 A1 Mar. 4, 2021

(51) Int. Cl.
*B23B 35/00* (2006.01)
*B23B 47/28* (2006.01)

(52) U.S. Cl.
CPC .......... *B23B 35/00* (2013.01); *B23B 47/287* (2013.01); *B23B 2247/12* (2013.01); *Y10T 408/554* (2015.01)

(58) Field of Classification Search
CPC ... B23B 35/00; B23B 47/287; B23B 2247/12; B23B 2260/118; B23B 2270/62; Y10T 408/554; Y10T 408/5622
See application file for complete search history.

(56) References Cited

U.S. PATENT DOCUMENTS

| | | | |
|---|---|---|---|
| 4,380,990 A * | 4/1983 | Giardini | B23B 51/042 125/20 |
| 7,070,365 B1 | 7/2006 | Blankenship | |
| 7,722,298 B2 | 5/2010 | Russel | |
| 9,849,553 B2 | 12/2017 | Bialy et al. | |
| 2020/0198071 A1* | 6/2020 | Oberoi | B64C 1/12 |

FOREIGN PATENT DOCUMENTS

| | | | |
|---|---|---|---|
| EP | 1170080 A1 * | 1/2002 | ........... B23B 47/287 |
| JP | 06297395 A | 10/1994 | |
| JP | 2591914 B2 | 3/1997 | |
| WO | 1993016818 A1 | 9/1993 | |
| WO | 2014018686 A1 | 1/2014 | |

OTHER PUBLICATIONS

International Search Report and Written Opinion dated May 29, 2020 International PCT Application No. PCT/US2019/049593.

* cited by examiner

*Primary Examiner* — Eric A. Gates
(74) *Attorney, Agent, or Firm* — McGuireWoods LLP

(57) ABSTRACT

Wall sealing and penetrator apparatus for use in penetrating walls in dangerous conditions. An example wall sealing and penetrator apparatus includes a first portion comprising: a first housing, a first sealing element, a first vacuum port; and a second portion comprising, a second housing, a second sealing element, a second vacuum port, and a cutting element.

20 Claims, 3 Drawing Sheets

BULKHEAD PENETRATIONS IN HAZARDOUS ENVIRONMENTS

TECHNICAL FIELD

The present disclosure relates generally to penetrating surfaces in hazardous environments, and more particularly, to isolating a section of a surface, such as a bulkhead on an offshore rig, to penetrate said surface while a drilling operation or other environmental hazard is present.

BACKGROUND

Drilling rigs are large structures containing equipment used to drill for hydrocarbons in a subterranean formation. Occasionally, a wall or bulkhead of a drilling rig may need to be opened in order to install or run cables or pipes to another location on the rig or in the wellbore. Penetrations of the walls or bulkhead through sawing or other use of abrasive materials against the surface may generate heat and/or sparks. The location of the walls or bulkhead may be a hazardous environment for heat and/or spark generation on the drilling rig. This may be of particular importance if a drilling operation is ongoing at the rig.

In order to reduce the risk of fire and/or explosion caused by the heat and/or sparks generated by the wall/bulkhead penetration, it may be best practice to shut down the drilling operation in order to penetrate the wall/bulkhead to install the cables, pipes, etc. needed for a wellbore operation. Shut down of a drilling operation increases operational expense, operation time, and non-productive time of employees not involved in the wall/bulkhead penetration. Alternatively, the penetration of the wall/bulkhead may have to be made after the drilling operation is completed. This approach may result in the inability to deploy some operations during drilling, such as wellbore logging and the like, if such operations are dependent on the installation of the necessary cables, etc. The present disclosure provides improved methods for penetrating a wall/bulkhead on a drilling rig while a drilling operation or other environmental hazard is present.

BRIEF DESCRIPTION OF THE DRAWINGS

Illustrative examples of the present disclosure are described in detail below with reference to the attached drawing figures, which are incorporated by reference herein, and wherein.

Figure 1:
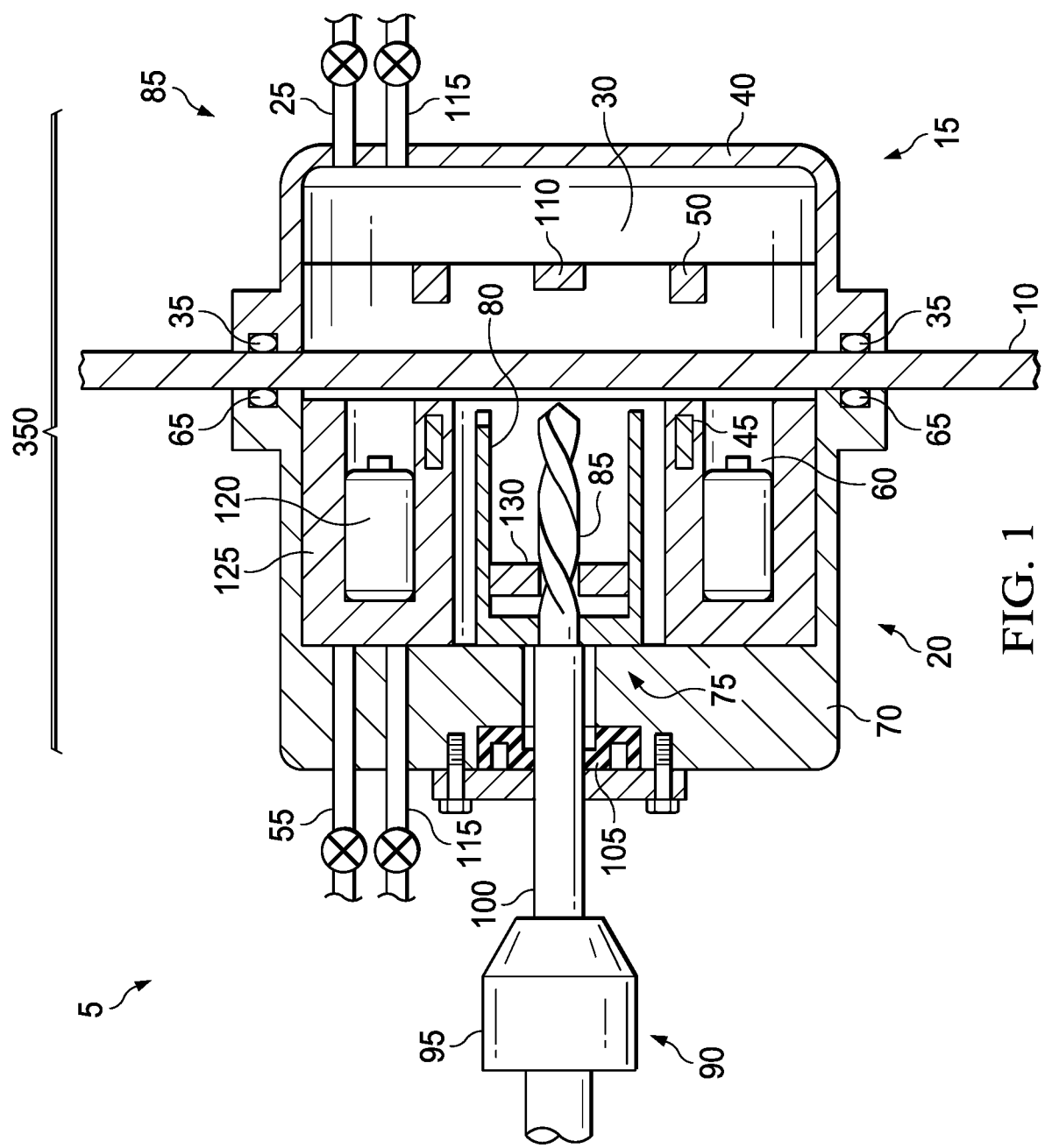
FIG. 1 is a schematic illustrating an example wall sealing and penetrator apparatus in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to penetrating surfaces in hazardous environments, and more particularly, to isolating a section of a surface, such as a bulkhead on an offshore rig, to penetrate said surface while a drilling operation or other environmental hazard is present.

In the following detailed description of several illustrative examples, reference is made to the accompanying drawings that form a part hereof, and in which is shown by way of illustration examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present disclosure. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The examples described herein relate to the use of an apparatus/method for vacuum sealing a surface of a wall/bulkhead on a drilling rig in order to isolate the surface as it is penetrated. The apparatus/method may be used to seal at least one side of a wall/bulkhead and apply a negative pressure to said sealed side to reduce the generation of heat and/or sparks as the wall/bulkhead is penetrated. Advantageously, the vacuum-sealed surface portion of the wall/bulkhead may be penetrated with a hole saw or other such abrasive material tool while under a near vacuum. As an additional advantage, the vacuum-sealed surface may be locked such that the seal may not be released until the internal temperature of the sealed portion is reduced below a desired temperature threshold. As a further advantage, both sides of the surface to be penetrated may be vacuum-sealed such that the sealed area remains under negative pressure even after penetration of the wall/bulkhead occurs. One additional advantage is that the motor for the abrasive material tool (e.g., a hole saw) may be power-locked to the pressure level within the vacuum-sealed area, such that the tool may not be operable until a desired level of vacuum is achieved. A still further advantage is that apparatus/method may be used on the drilling rig when an environmental hazard is present. For example, the apparatus/method may be used to penetrate a wall/bulkhead of a drilling rig while the drilling operation is occurring.

As used herein, the term "vacuum," and as used in any form such as "vacuum-sealed," refers to the application of negative pressure to an enclosed area that is sealed or to be sealed, resulting in an internal pressure that is lower relative to the atmospheric pressure outside of the sealed or to be sealed area. The vacuum achieved within the sealed area is not to be thought of as a perfect vacuum, but a partial vacuum as would be readily apparent to one of ordinary skill in the art.

As used herein, "wall" refers to any dividing structure between compartments on a drilling rig or ship. A "bulkhead," as used herein, is a retaining wall. The wall may be any type of wall and comprise any type of material. As will be appreciated by those of ordinary skill in the art, the vacuum-sealing apparatus may be used on the surface of any wall to penetrate said wall.

With reference to FIG. 1, an example wall sealing and penetrator apparatus, generally 5, is illustrated. Wall sealing and penetrator apparatus 5 may be placed over a surface of a wall 10 after a location for penetration of the wall 10 is determined. Wall sealing and penetrator apparatus 5 comprises a first portion, generally 15, and a second portion, generally 20. First portion 15 may be placed over the target section of the surface of the wall 10 as illustrated. When in position over the target section of the wall 10, a vacuum may be applied via vacuum port 25 disposed in and also traversing a housing 40 of the first portion 15. Vacuum port 25 may be used to remove air from within an internal space 30 of the first portion 15 when the first portion 15 is placed on the surface of the wall 10, resulting in a negative pressure within the internal space 30. The internal space 30 is formed by the boundaries of the first portion 15 and the surface of the wall 10 when the first portion 15 has been placed on the target section of the wall 10 to enclose an area around the surface of the wall 10. The void within this enclosed area is the internal space 30. The pressure differential between the internal space 30 and the external pressure outside of the first portion 15 created by vacuum port 25 induces the seals 35 of the first portion 15 to engage the surface of the wall 10 such that they maintain the first portion 15 against the surface of the wall 10. This engagement results in the locking of the first portion 15 of the wall sealing and penetrator apparatus 5 into place and the sealing of the internal space 30 from the exterior environment external to the first portion 15. The vacuum may be maintained within the internal space 30 during use so as to maintain the seal of the first portion 15 against the wall 10. The housing 40 of the first portion 15 may be made of aluminum, copper, and similar materials useful for transferring the heat generated by the penetration of the wall 10 and retained in the internal space 30 to the external environment as the wall sealing and penetrator apparatus 5 is used. Although metals are listed as potential examples of housing 40 materials, it is to be understood that any material, including non-metals, with sufficient heat transfer properties and/or capable of being configured for heat transfer may be used, provided said material possesses sufficient stability and strength to be used with the intended application.

The second portion 20 of the wall sealing and penetrator apparatus 5 may be installed in an analogous fashion to the first portion 15. The second portion sensors 45 may detect the presence and location of the first portion sensors 50. The second portion sensors 45 may signal to an operator when the second portion 20 is aligned with the first portion 15 on the other side of the wall 10. Second portion sensors 45 and first portion sensors 50 may be any type of sensor sufficient for the detection of the location and correct alignment of the other sensor opposite the wall 10. Second portion sensors 45 and first portion sensors 50 may provide any signal to the operator sufficient to indicate correct alignment. For example, the sensors may initiate auditory and/or visual signaling. When the second portion sensors 45 have signaled that the second portion 20 is aligned with the first portion 15, the second portion 20 may be sealed on the surface of the wall 10 as was done with the first portion 15. When in position over the target location of the surface of the wall 10, a vacuum may be applied via the vacuum port 55. Vacuum port 55 may be used to remove air from within an internal space 60 of the second portion 20 when the second portion 20 is placed on the target location of the surface of the wall 10, producing a negative pressure within the internal space 60. The internal space 60 is formed by the boundaries of the second portion 20 and the surface of the wall 10 when the second portion 20 has been placed on the target section of the wall 10 to enclose an area around the surface of the wall 10. The void within this enclosed area is the internal space 60. The pressure differential between the internal space 60 and the external pressure outside of the second portion 20 results in the seals 65 of the second portion 20 engaging the surface of the wall 10. This engagement results in the locking of the second portion 20 of the wall sealing and penetrator apparatus 5 into place and the sealing of the internal space 60 from the exterior environment external to the second portion 20. The vacuum may be maintained within the internal space 60 during use so as to maintain the seal of the second portion 20 against the wall 10. The housing 70 of the second portion 20 may be made of aluminum, copper, and similar materials useful for transferring the heat generated by the penetration of the wall 10 and retained in the internal space 60 to the external environment as the wall sealing and penetrator apparatus 5 is used. Although metals are listed as potential examples of housing 70 materials, it is to be understood that any material, including non-metals, with sufficient heat transfer properties and/or capable of being configured for heat transfer may be used, provided said material possesses sufficient stability and strength to be used with the intended application.

Although FIG. 1 is described as attaching and sealing the first portion 15 before the second portion 20 of the wall sealing and penetrator apparatus 5, it is to be understood that the second portion 20 may be attached and sealed before the attachment and sealing of the first portion 15. The order of attachment and sealing of the first portion 15 and the second portion 20 may be reversed for any example and illustration described herein.

When the first portion 15 and the second portion 20 are in place and sealed over their respective sections of wall 10, the wall 10 may be penetrated with any type of cutting element 75. In the illustrated figure, cutting element 75 is a carbide-tipped hole saw having a carbide-tipped cutter 80 and a pilot drill bit 85. A hole saw, such as the one illustrated, may be used for providing knockout hole punches through wall 10 in order to make a circular cut sufficient for running cables, pipes, tubing, etc. Although cutting element 75 is represented as a carbide-tipped hole saw, it is to be understood that any type of cutting element 75 may be used, including a drill bit without the circular carbide-tipped cutter 80 of the aforementioned hole saw. The cutting element 75 is rotated by an external air-powered drill 90. The motor portion 95 of the external air-powered drill 90 is external to the housing 70 of the second portion 20, and the bit portion 100 extends though a sealing element 105 which is built into and traverses the housing 70 of the second portion 20. Sealing element 105 permits axial and rotational movement of the bit portion 100 without the loss of the vacuum maintained within the internal space 60 while the wall 10 is penetrated. The vacuum within the internal space 60 reduces heat generation and/or spark generation in the internal space 60, thereby reducing the risk of fire and/or explosion in a hazardous environment such as the environment when a drilling operation is conducted.

A temperature sensor 110 may be used to monitor the temperature of the wall 10 as the wall 10 is penetrated. In some optional examples, the temperature sensor 110 may prevent release of the vacuum until the temperature is reduced below a predetermined threshold. The temperature sensor 110 may be any sensor sufficient for measuring the temperature rise of the wall 110 and may include an infrared temperature sensor. When it is desired for the vacuum to be removed so that the first portion 15 and the second portion 20 may be unsealed from the wall 10, vacuum removal ports 115 may be used to open the first portion 15 and the second portion 20. Vacuum removal ports 115 allow for the internal pressure to increase in the internal spaces 30 and 60 respectively. Vacuum removal ports 115 may be used to equalize the pressure within the internal spaces 30 and 60 with that of the external environment by opening the ports and leaving them open until said pressure is equalized.

Batteries 120 may be used to power a control system 125. Control system 125 may manage the penetration of the wall 10 by the cutting element 75 including restraining the axial movement of the cutting element 75 so as to prevent it from contacting the components of the first portion 15 as wall 10 is penetrated. Control system 125 may also instruct the cutting element 75 to operate in shortened bursts instead of continuously. Instruction to operate in bursts may be useful in some instances when the heat in the wall 10, as measured by temperature sensor 110 or another temperature sensor, exceeds a temperature threshold above which the continuous use of the cutting element 75 would undesirably increase the risk of fire and/or explosion. The control system 125 may also halt the operation of the cutting element 75 until the wall 10 temperature has dropped below the desired temperature threshold. Control system 125 may thus prevent operation of the cutting element 75 unless the wall 10 temperature is within an acceptable temperature range. Additionally, control system 125 may control the speed of the axial and rotational movement of the cutting element 75 so as to reduce temperature buildup. For example, the control system 125 may reduce the axial and rotational movement of the cutting element 75 should the wall 10 temperature begin to approach the temperature threshold at which operation of the cutting element 75 may need to be stopped. In some optional examples, control system 125 may also lock the vacuum removal ports 115, thereby preventing opening of said ports until the temperature of the wall 10 is reduced below a predetermined temperature threshold. In some further optional examples, the control system 125 may also lock the cutting element 75, thereby preventing its activation unless a desired level of vacuum is achieved/maintained in the internal spaces 30 and 60 of the first portion 15 and second portion 20, respectively. In some additional optional examples, control system 125 may activate a cooling system (not shown) to induce cooling of the internal spaces 30 and 60 and wall 10. The cooling system may comprise any cooling system as would be known in the art including liquid cooling and air cooling systems. The cooling system may be activated before, during, or after use of the cutting element 75.

Magnets 130 may be disposed in the base of or adjacent to the cutting element 75 to collect metal shavings as wall 10 is penetrated. The magnets 130 may be any size and shape of magnet sufficient to attract and retain metal shavings without detrimental interference of the other components of the wall sealing and penetrator apparatus 5. It is to be understood that magnets 130 are optional, and other components/techniques for collecting and retaining wall shavings may be used.

It is to be understood that in some optional examples, first portion 15 may not be a necessary component of the wall sealing and penetrator apparatus 5. In such examples, only the second portion 20 is sealed against the surface of the wall 10. It is to be further understood that in such examples, penetration of the wall 10 will release the vacuum within the internal space 60 of the sealed second portion 20.

It should be clearly understood that the systems illustrated by FIG. 1 is merely a general application of the principles of this disclosure in practice, and a wide variety of other examples are possible. Therefore, the scope of this disclosure is not limited in any manner to the details of FIG. 1 as described herein.

Figure 2:
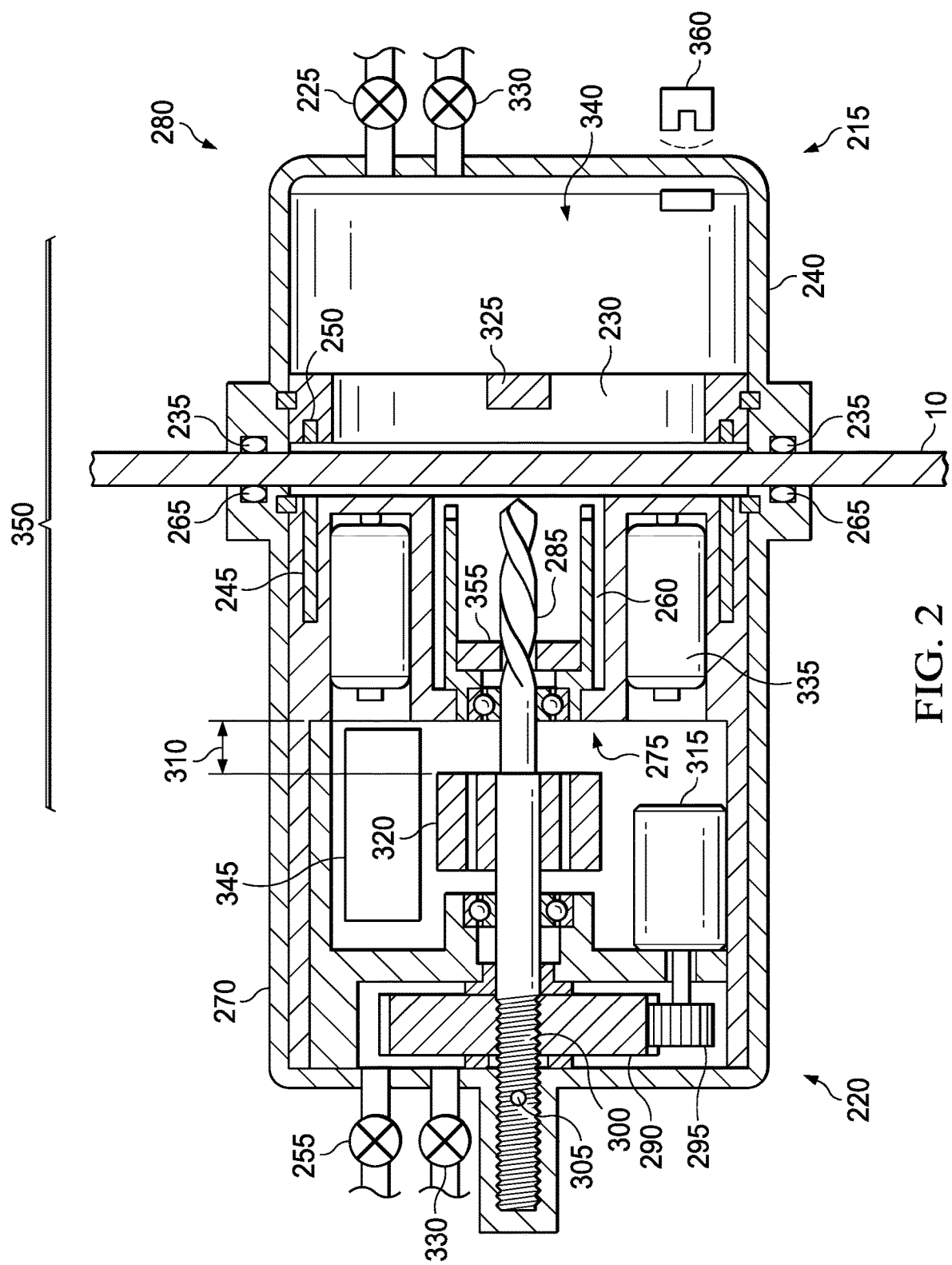
FIG. 2 is a schematic illustrating another example wall sealing and penetrator apparatus in accordance with one or more examples described herein.

With reference to FIG. 2, another example of a wall sealing and penetrator apparatus, generally 200, is illustrated. Wall sealing and penetrator apparatus 200 may be placed over a surface of a wall 10 after a location for penetration of the wall 10 is determined. Wall sealing and penetrator apparatus 200 comprises a first portion, generally 215, and a second portion, generally 220. First portion 215 may be placed over the target section of the surface of the wall 10 as illustrated. When in position over the target section of the wall 10, a vacuum may be applied via vacuum port 225 disposed in and also traversing a housing 240 of the first portion 215. Vacuum port 225 may be used to remove air from within an internal space 230 of the first portion 215 when the first portion 215 is placed on the surface of the wall 10, resulting in a negative pressure within the internal space 230. The internal space 230 is formed by the boundaries of the first portion 215 and the surface of the wall 10 when the first portion 215 has been placed on the target section of the wall 10 to enclose an area around the surface of the wall 10. The void within this enclosed area is the internal space 230. The pressure differential between the internal space 230 and the external pressure outside of the first portion 215, created by vacuum port 225, induces the seals 235 of the first portion 215 to engage the surface of the wall 10 such that they maintain the first portion 215 against the surface of the wall 10. This engagement results in the locking of the first portion 215 of the wall sealing and penetrator apparatus 200 into place and the sealing of the internal space 230 from the exterior environment external to the first portion 215. The vacuum may be maintained within the internal space 230 during use so as to maintain the seal of the first portion 215 against the wall 10. The housing 240 of the first portion 215 may be made of aluminum, copper, and similar materials useful for transferring the heat generated by the penetration of the wall 10 and retained in the internal space 230 to the external environment as the wall sealing and penetrator apparatus 200 is used. Although metals are listed as potential examples of housing 240 materials, it is to be understood that any material, including non-metals, with sufficient heat transfer properties and/or capable of being configured for heat transfer may be used, provided said material possesses sufficient stability and strength to be used with the intended application.

The second portion 220 of the wall sealing and penetrator apparatus 200 may be installed in an analogous fashion to the first portion 215. The second portion sensors 245 may detect the presence and location of the first portion sensors 250. The second portion sensors 245 may signal to an operator when the second portion 220 is aligned with the first portion 215 on the other side of the wall 10. Second portion sensors 245 and first portion sensors 250 may be any type of sensor sufficient for the detection of the location and correct alignment of the other sensor opposite the wall 10. Second portion sensors 245 and first portion sensors 250 may provide any signal to the operator sufficient to indicate correct alignment. For example, the sensors may initiate auditory and/or visual signaling. When the second portion sensors 245 have signaled that the second portion 220 is aligned with the first portion 215, the second portion 220 may be sealed on the surface of the wall 10 as was done with the first portion 215. When in position over the target location of the surface of the wall 10, a vacuum may be applied via the vacuum port 255. Vacuum port 255 may be used to remove air from within an internal space 260 of the second portion 220 when the second portion 220 is placed on the target location of the surface of the wall 10, thereby producing a negative pressure within the internal space 260. The internal space 260 is formed by the boundaries of the second portion 220 and the surface of the wall 10 when the second portion 220 has been placed on the target section of the wall 10 to enclose an area around the surface of the wall 10. The void within this enclosed area is the internal space 260. The pressure differential between the internal space 260 and the external pressure outside of the second portion 220 results in the seals 265 of the second portion 220 engaging the surface of the wall 10. This engagement results in the locking of the second portion 220 of the wall sealing and penetrator apparatus 200 into place and the sealing of the internal space 260 from the exterior environment external to the second portion 220. The vacuum may be maintained within the internal space 260 during use so as to maintain the seal of the second portion 220 against the wall 10. The housing 270 of the second portion 220 may be made of aluminum, copper, and similar materials useful for transferring the heat generated by the penetration of the wall 10 and retained in the internal space 260 to the external environment as the wall sealing and penetrator apparatus 200 is used. Although metals are listed as potential examples of housing 270 materials, it is to be understood that any material, including non-metals, with sufficient heat transfer properties and/or capable of being configured for heat transfer may be used, provided said material possesses sufficient stability and strength to be used with the intended application.

Although FIG. 2 is described as attaching and sealing the first portion 215 before the second portion 220 of the wall sealing and penetrator apparatus 200, it is to be understood that the second portion 220 may be attached and sealed before the attachment and sealing of the first portion 215. The order of attachment and sealing of the first portion 215 and the second portion 220 may be reversed for any example and illustration described herein.

When the first portion 215 and the second portion 220 are in place and sealed over their respective sections of wall 10, the wall 10 may be penetrated with any type of cutting element, generally 275. In the illustrated figure, cutting element 275 is a carbide-tipped hole saw having a carbide-tipped cutter 280 and a pilot drill bit 285. A hole saw, such as the one illustrated, may be used for providing knockout hole punches through wall 10 in order to make a circular cut sufficient for running cables, pipes, tubing, etc. Although cutting element 275 is represented as a carbide-tipped hole saw, it is to be understood that any type of cutting element 275 may be used, including a drill bit without the circular carbide-tipped cutter 280 of the aforementioned hole saw. The cutting element 275 is advanced by an internal gear 290 that drives the axial movement of the cutting element 275. The internal gear 290 is rotated by a pinion gear 295 that drives the internal gear 290. The bit portion 300 of the cutting element 275 may be threaded in a manner that syncs with threading of the internal gear 290 such that rotation of internal gear 290 induces axial movement of the cutting element 275. Pin 305 may be used to eliminate rotation of this threaded portion of the bit portion 300 and the internal gear 290 thereby halting axial movement of the cutting element 275. Distance 310 is the typical distance that the cutting element 275 is allowed to advance. The pinion gear 295 is powered by an internal axial motor 315. Internal axial motor 315 drives the pinion gear 295 which rotates the threaded internal gear 290 thereby advancing the corresponding bit portion 300 and inducing axial movement of the cutting element 275. As the threaded portion of the bit portion 300 has a fixed length, there is a limit to the distance the cutting element 275 is allowed to advance axially. This limit should exceed the depth of the portion of the wall 10 to be penetrated, but not be so great as to allow the cutting element 275 to advance into the first portion 215 such that it is able to contact and potentially damage the components of the first portion 215. Motor 320 powers the rotational movement of the cutting element 275 to penetrate the wall 10. The motor 320 should be sufficiently powerful to enable the cutting element 275 to penetrate wall 10 as desired.

As the cutting element 275 is powered by internal motors and associated internal components, these portions of the example wall sealing and penetrator apparatus 200 of FIG. 2 do not require sealing elements, such as sealing elements 105 in FIG. 1, to seal around traversing components connecting the cutting element 275 to an external motor such as the external air-powered drill 90 of FIG. 1. Cutting element 275 may not be coupled to any internal and/or external component that traverses housing 270.

The vacuum within the internal space 260 reduces heat generation and/or spark generation in the internal space 260, thereby reducing the risk of fire and/or explosion in a hazardous environment such as the environment when a drilling operation is conducted.

A temperature sensor 325 may be used to monitor the temperature of the wall 10 as the wall 10 is penetrated. In some optional examples, the temperature sensor 325 may prevent release of the vacuum until the temperature is reduced below a predetermined threshold. The temperature sensor 325 may be any sensor sufficient for measuring the temperature rise of the wall 10 and may include an infrared temperature sensor. When it is desired for the vacuum to be removed so that the first portion 215 and the second portion 220 may be unsealed from the wall 10, vacuum removal ports 330 may be used to open the first portion 215 and the second portion 220. Vacuum removal ports 330 allow for the internal pressure to increase in the internal spaces 230 and 260 respectively. Vacuum removal ports 330 may be used to equalize the pressure within the internal spaces 230 and 260 with that of the external environment by opening the ports and leaving them open until said pressure is equalized.

Batteries 335 may be used to power at least part of a control system 350. The control system 350 is illustrated as comprising a first part 340 in the first portion 215 and a second part 345 in the second portion 220. Batteries 335, obscured in the first portion 215 for clarity of illustration, may be used to power the first part 340 which may control sensors (such as sensor 325) and the vacuum ports 225 and 330 in the first portion 215. Batteries 335 power the second part 345 in the second portion 220. The first part 340 is in communication with the second part 345. Splitting of the control system 350 into two parts may allow for the individual control of some or all of the elements of the first portion 215 and the second portion 220, such as sensors, vacuum ports, and the cutting element. The first part 340 and the second part 345 may relay data to and from each other as well as issue instructions to and from each other. The second part 345 may control the cutting element 275, vacuum ports 255 and 330, and any sensors or other elements located in the second portion 215. The control system 350 manages the penetration of the wall 10 by the cutting element 275 including restraining the axial movement of the cutting element 275 so as to prevent it from contacting the components of the first portion 215 as wall 10 is penetrated. The control system 350 may also instruct the cutting element 275 to operate in shortened bursts instead of continuously. Instruction to operate in bursts may be useful in some instances when the heat in the wall 10, as measured by temperature sensor 325 or another temperature sensor, exceeds a temperature threshold above which the continuous use of the cutting element 275 would undesirably increase the risk of fire and/or explosion. The control system 350 may also halt the operation of the cutting element 275 until the wall 10 temperature has dropped below the desired temperature threshold. Control system 350 may thus prevent operation of the cutting element 275 unless the wall 10 temperature is within an acceptable temperature range. Additionally, control system 350 may control the speed of the axial and rotational movement of the cutting element 275 so as to reduce temperature buildup. For example, the control system 350 may reduce the axial and rotational movement of the cutting element 275 should the wall 10 temperature begin to approach the temperature threshold at which operation of the cutting element 275 may need to be suspended. In some optional examples, control system 350 may also lock the vacuum removal ports 330, thereby preventing opening of said ports until the temperature of the wall 10 is reduced below a predetermined temperature threshold. In some further optional examples, the control system 350 may also lock the cutting element 275, thereby preventing its activation unless a desired level of vacuum is achieved/maintained in the internal spaces 230 and 260 of the first portion 215 and second portion 220, respectively. In some additional optional examples, control system 350 may activate a cooling system (not shown) to induce cooling of the internal spaces 230 and 260 and wall 10. The cooling system may comprise any cooling system as would be known in the art including liquid cooling and air cooling systems. The cooling system may be activated before, during, or after use of the cutting element 275.

Magnets 355 may be disposed in the base of or adjacent to the cutting element 275 to collect metal shavings as wall 10 is penetrated. The magnets 355 may be any size and shape of magnet sufficient to attract and retain metal shavings without detrimental interference of the other components of the wall sealing and penetrator apparatus 200. It is to be understood that magnets 355 are optional, and other components/techniques for collecting and retaining wall shavings may be used.

Magnetic switch 360 is an external communication means which may be used to activate the wall sealing and penetrator apparatus 200, and/or allow for other types of communication with the wall sealing and penetrator apparatus 200 such as providing instructions, adjustment of operational parameters, initiating shutdown, extraction of data, insertion of data, etc.

It is to be understood that in some optional examples, first portion 215 may not be a necessary component of the wall sealing and penetrator apparatus 200. In such examples, only the second portion 220 is sealed against the surface of the wall 10. It is to be further understood that in such examples, penetration of the wall 10 will release the vacuum within the internal space 260 of the sealed second portion 220.

It should be clearly understood that the systems illustrated by FIG. 2 is merely a general application of the principles of this disclosure in practice, and a wide variety of other examples are possible. Therefore, the scope of this disclosure is not limited in any manner to the details of FIG. 2 as described herein.

Figure 3:
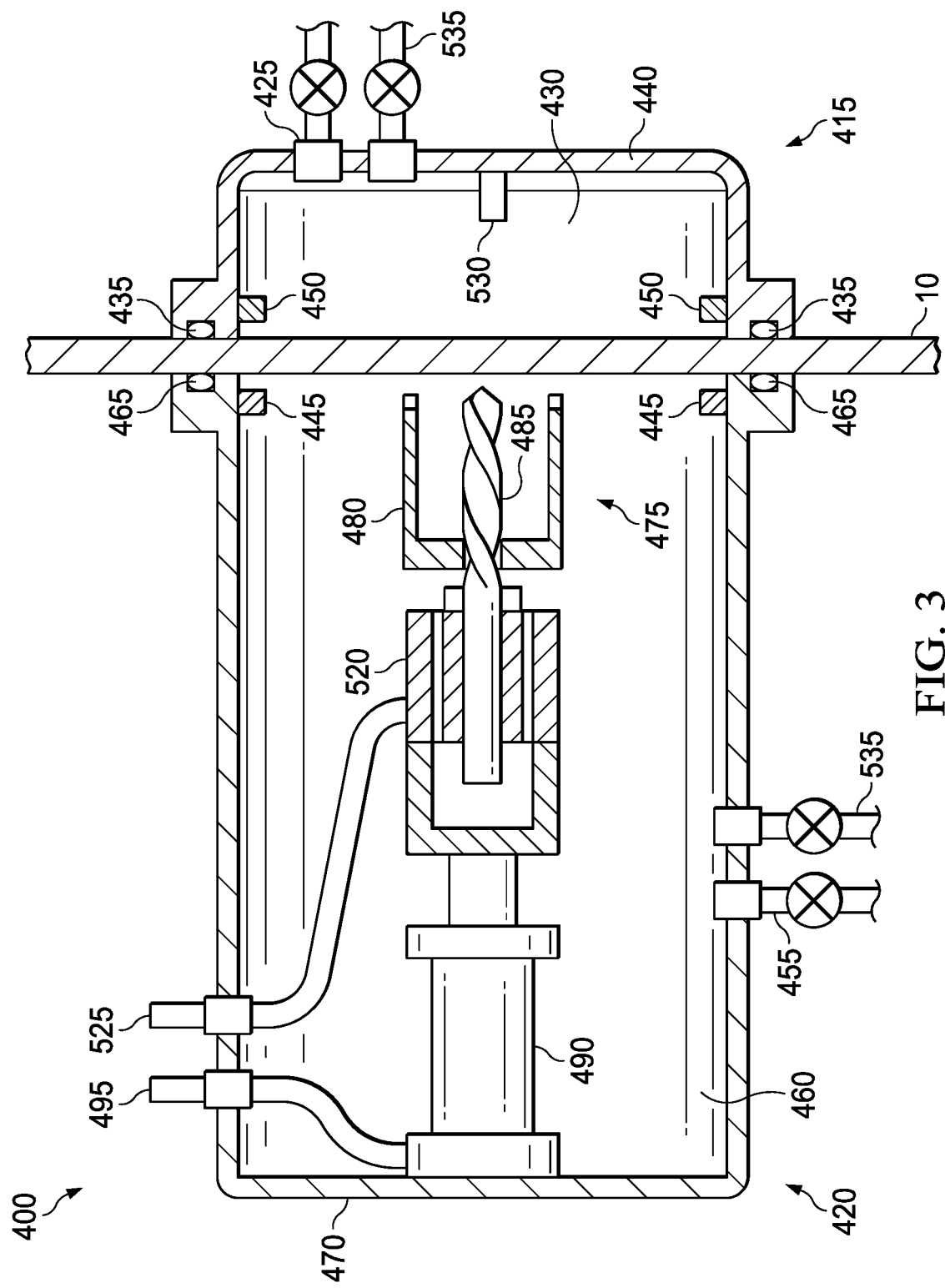
FIG. 3 is a schematic illustrating yet another example wall sealing and penetrator apparatus in accordance with one or more examples described herein.

With reference to FIG. 3, another example of a wall sealing and penetrator apparatus, generally 400, is illustrated. Wall sealing and penetrator apparatus 400 may be placed over a surface of a wall 10 after a location for penetration of the wall 10 is determined. Wall sealing and penetrator apparatus 400 comprises a first portion, generally 415, and a second portion, generally 420. First portion 415 may be placed over the target section of the surface of the wall 10 as illustrated. When in position over the target section of the wall 10, a vacuum may be applied via vacuum port 425 disposed in and also traversing a housing 440 of the first portion 415. Vacuum port 425 may be used to remove air from within an internal space 430 of the first portion 415 when the first portion 415 is placed on the surface of the wall 10, resulting in a negative pressure within the internal space 430. The internal space 430 is formed by the boundaries of the first portion 415 and the surface of the wall 10 when the first portion 415 has been placed on the target section of the wall 10 to enclose an area around the surface of the wall 10. The void within this enclosed area is the internal space 430. The pressure differential between the internal space 430 and the external pressure outside of the first portion 415, created by vacuum port 425, induces the seals 435 of the first portion 415 to engage the surface of the wall 10 such that they maintain the first portion 415 against the surface of the wall 10. This engagement results in the locking of the first portion 415 of the wall sealing and penetrator apparatus 400 into place and the sealing of the internal space 430 from the exterior environment external to the first portion 415. The vacuum may be maintained within the internal space 430 during use so as to maintain the seal of the first portion 415 against the wall 10. The housing 440 of the first portion 415 may be made of aluminum, copper, and similar materials useful for transferring the heat generated by the penetration of the wall 10 and retained in the internal space 430 to the external environment as the wall sealing and penetrator apparatus 400 is used. Although metals are listed as potential examples of housing 440 materials, it is to be understood that any material, including non-metals, with sufficient heat transfer properties and/or capable of being configured for heat transfer may be used, provided said material possesses sufficient stability and strength to be used with the intended application.

The second portion 420 of the wall sealing and penetrator apparatus 400 may be installed in an analogous fashion to the first portion 415. The second portion sensors 445 may detect the presence and location of the first portion sensors 450. The second portion sensors 445 may signal to an operator when the second portion 420 is aligned with the first portion 415 on the other side of the wall 10. Second portion sensors 445 and first portion sensors 450 may be any type of sensor sufficient for the detection of the location and correct alignment of the other sensor opposite the wall 10. Second portion sensors 445 and first portion sensors 450 may provide any signal to the operator sufficient to indicate correct alignment. For example, the sensors may initiate auditory and/or visual signaling. When the second portion sensors 445 have signaled that the second portion 420 is aligned with the first portion 415, the second portion 420 may be sealed on the surface of the wall 10 as was done with the first portion 415. When in position over the target location of the surface of the wall 10, a vacuum may be applied via the vacuum port 455. Vacuum port 455 may be used to remove air from within an internal space 460 of the second portion 420 when the second portion 420 is placed on the target location of the surface of the wall 10, thereby producing a negative pressure within the internal space 460. The internal space 460 is formed by the boundaries of the second portion 420 and the surface of the wall 10 when the second portion 420 has been placed on the target section of the wall 10 to enclose an area around the surface of the wall 10. The void within this enclosed area is the internal space 460. The pressure differential between the internal space 460 and the external pressure outside of the second portion 420 results in the seals 465 of the second portion 420 engaging the surface of the wall 10. This engagement results in the locking of the second portion 420 of the wall sealing and penetrator apparatus 400 into place and the sealing of the internal space 460 from the exterior environment external to the second portion 420. The vacuum may be maintained within the internal space 460 during use so as to maintain the seal of the second portion 420 against the wall 10. The housing 470 of the second portion 420 may be made of aluminum, copper, and similar materials useful for transferring the heat generated by the penetration of the wall 10 and retained in the internal space 460 to the external environment as the wall sealing and penetrator apparatus 400 is used. Although metals are listed as potential examples of housing 470 materials, it is to be understood that any material, including non-metals, with sufficient heat transfer properties and/or capable of being configured for heat transfer may be used, provided said material possesses sufficient stability and strength to be used with the intended application.

Although FIG. 3 is described as attaching and sealing the first portion 415 before the second portion 420 of the wall sealing and penetrator apparatus 400, it is to be understood that the second portion 420 may be attached and sealed before the attachment and sealing of the first portion 415. The order of attachment and sealing of the first portion 415 and the second portion 420 may be reversed for any example and illustration described herein.

When the first portion 415 and the second portion 420 are in place and sealed over their respective sections of wall 10, the wall 10 may be penetrated with any type of cutting element, generally 475. In the illustrated figure, cutting element 475 is a carbide-tipped hole saw having a carbide-tipped cutter 480 and a pilot drill bit 485. A hole saw, such as the one illustrated, may be used for providing knockout hole punches through wall 10 in order to make a circular cut sufficient for running cables, pipes, tubing, etc. Although cutting element 475 is represented as a carbide-tipped hole saw, it is to be understood that any type of cutting element 475 may be used, including a drill bit without the circular carbide-tipped cutter 480 of the aforementioned hole saw. The cutting element 475 is advanced by pneumatic cylinder 490 that drives the axial movement of the cutting element 475. The pneumatic cylinder 490 is controlled by an external drilling press control 495 which traverses housing 470. The external drilling press control 495 allows an operator to advance the cutting element 475 into the wall 10 by increasing the pressure within the pneumatic cylinder 490. In some optional examples, the pneumatic cylinder 490 and/or the cutting element 475 may comprise features to prevent the cutting element 475 from advancing into the first portion 415 such that it is able to contact and potentially damage the components of the first portion 415. In some other optional examples, the pneumatic cylinder 490 and/or the cutting element 475 may comprise features to signal to the operator the depth with which the cutting element 475 has cut into the wall 10. Motor 520 is an air motor that powers the rotational movement of the cutting element 475 to penetrate the wall 10. The motor 520 should be sufficiently powerful to enable the cutting element 475 to penetrate wall 10 as desired. Motor 520 is controlled by an external drilling speed control 525 which traverses housing 470. The external drilling speed control 525 allows an operator to increase the rotational speed of the cutting element 475.

As the cutting element 475 is powered by internal motors and associated internal components, these portions of the example wall sealing and penetrator apparatus 400 of FIG. 3 do not require sealing elements, such as sealing elements 105 in FIG. 1, to seal around traversing components connecting the cutting element 475 to an external motor such as the external air-powered drill 90 of FIG. 1. Cutting element 475 may not be coupled to any internal and/or external component that traverses housing 470.

The vacuum within the internal space 460 reduces heat generation and/or spark generation in the internal space 460, thereby reducing the risk of fire and/or explosion in a hazardous environment such as the environment when a drilling operation is conducted.

A temperature sensor 530 may be used to monitor the temperature of the wall 10 as the wall 10 is penetrated. In some optional examples, the temperature sensor 530 may prevent release of the vacuum until the temperature is reduced below a predetermined threshold. The temperature sensor 530 may be any sensor sufficient for measuring the temperature rise of the wall 10 and may include an infrared temperature sensor. When it is desired for the vacuum to be removed so that the first portion 415 and the second portion 420 may be unsealed from the wall 10, vacuum removal ports 535 may be used to open the first portion 415 and the second portion 420. Vacuum removal ports 535 allow for the internal pressure to increase in the internal spaces 430 and 460 respectively. Vacuum removal ports 535 may be used to equalize the pressure within the internal spaces 430 and 460 with that of the external environment by opening the ports and leaving them open until said pressure is equalized.

In some optional examples, the wall sealing and penetrator apparatus 400 may activate a cooling system (not shown) to induce cooling of the internal spaces 430 and 460 and wall 10. The cooling system may comprise any cooling system as would be known in the art including liquid cooling and air cooling systems. The cooling system may be activated before, during, or after use of the cutting element 475. In some additional optional examples, magnets may be disposed in the base of or adjacent to the cutting element 475 to collect metal shavings as wall 10 is penetrated. The magnets may be any size and shape of magnet sufficient to attract and retain metal shavings without detrimental interference of the other components of the wall sealing and penetrator apparatus 400. Other optional components/techniques for collecting and retaining wall shavings may also be used.

It is to be understood that in some optional examples, first portion 415 may not be a necessary component of the wall sealing and penetrator apparatus 400. In such examples, only the second portion 420 is sealed against the surface of the wall 10. It is to be further understood that in such examples, penetration of the wall 10 will release the vacuum within the internal space 460 of the sealed second portion 420.

It should be clearly understood that the systems illustrated by FIG. 3 is merely a general application of the principles of this disclosure in practice, and a wide variety of other examples are possible. Therefore, the scope of this disclosure is not limited in any manner to the details of FIG. 3 as described herein.

It is also to be recognized that the disclosed wall sealing and penetrator apparatus may also directly or indirectly affect the various downhole equipment and tools that may contact the wall sealing and penetrator apparatus disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIGS. 1-3.

Provided are methods of penetrating a wall in accordance with the disclosure and the illustrated FIGs. An example method comprises providing a wall sealing and penetrator apparatus comprising: a first portion comprising: a first housing, a first sealing element, a first vacuum port; and a second portion comprising, a second housing, a second sealing element, a second vacuum port, and a cutting element. The method further comprises sealing the first portion on a first side of the wall by placing the first portion on the first side and removing air from a first internal space within the placed first portion with the first vacuum port, wherein the removal of air from the first internal space actuates the first sealing element to seal the first portion on the first side of the wall. The method further comprises sealing the second portion on a second side of the wall by placing the second portion on the second side and removing air from a second internal space within the placed second portion with the second vacuum port, wherein the removal of air from the second internal space actuates the second sealing element to seal the second portion on the second side of the wall. The method also comprises actuating the cutting element to cut the wall.

Additionally or alternatively, the method may include one or more of the following features individually or in combination. The cutting element may be a hole saw. The cutting element may comprise a drill bit; wherein the cutting element is coupled to a drill via the drill bit, and the drill bit traverses the second housing; and wherein the drill is external to the second housing. The cutting element may be coupled to a first internal motor that actuates axial movement of the cutting element; wherein the cutting element is coupled to a second internal motor that actuates rotational movement of the cutting element; wherein the first internal motor and the second internal motor are disposed in the second portion and do not traverse the second housing. The cutting element may be coupled to an internal pneumatic cylinder that actuates axial movement of the cutting element; wherein the cutting element is coupled to an internal air motor that actuates rotational movement of the cutting element; wherein the internal pneumatic cylinder and the internal air motor are disposed in the second portion and do not traverse the second housing. The first portion may comprise a first sensor and the second portion may comprise a second sensor; wherein the first sensor and the second sensor sense when the first sensor is aligned with the second sensor. The wall sealing and penetrator apparatus may further comprise a temperature sensor in at least one of the first portion and the second portion. The wall sealing and penetrator apparatus may further comprise a control system in at least one of the first portion and the second portion. The wall may be a wall on a drilling rig and wherein the method is performed during a drilling operation conducted at the drilling rig.

Provided are wall sealing and penetrator apparatus in accordance with the disclosure and the illustrated FIGs. An example wall sealing and penetrator apparatus comprises a first portion comprising: a first housing, a first sealing element, a first vacuum port; and a second portion comprising, a second housing, a second sealing element, a second vacuum port, and a cutting element.

Additionally or alternatively, the wall sealing and penetrator apparatus may include one or more of the following features individually or in combination. The cutting element may be a hole saw. The cutting element may comprise a drill bit; wherein the cutting element is coupled to a drill via the drill bit, and the drill bit traverses the second housing; and wherein the drill is external to the second housing. The cutting element may be coupled to a first internal motor that actuates axial movement of the cutting element; wherein the cutting element is coupled to a second internal motor that actuates rotational movement of the cutting element; wherein the first internal motor and the second internal motor are disposed in the second portion and do not traverse the second housing. The cutting element may be coupled to an internal pneumatic cylinder that actuates axial movement of the cutting element; wherein the cutting element is coupled to an internal air motor that actuates rotational movement of the cutting element; wherein the internal pneumatic cylinder and the internal air motor are disposed in the second portion and do not traverse the second housing. The first portion may comprise a first sensor and the second portion may comprise a second sensor; wherein the first sensor and the second sensor sense when the first sensor is aligned with the second sensor. The wall sealing and penetrator apparatus may further comprise a temperature sensor in at least one of the first portion and the second portion. The wall sealing and penetrator apparatus may further comprise a control system in at least one of the first portion and the second portion.

Provided are systems for penetrating a wall in accordance with the disclosure and the illustrated FIGs. An example system comprises a wall sealing and penetrator apparatus comprising a first portion comprising: a first housing, a first sealing element, a first vacuum port; and a second portion comprising, a second housing, a second sealing element, a second vacuum port, and a cutting element. The system further comprises a drilling rig comprising the wall.

Additionally or alternatively, the system may include one or more of the following features individually or in combination. The cutting element may be a hole saw. The cutting element may comprise a drill bit; wherein the cutting element is coupled to a drill via the drill bit, and the drill bit traverses the second housing; and wherein the drill is external to the second housing. The cutting element may be coupled to a first internal motor that actuates axial movement of the cutting element; wherein the cutting element is coupled to a second internal motor that actuates rotational movement of the cutting element; wherein the first internal motor and the second internal motor are disposed in the second portion and do not traverse the second housing. The cutting element may be coupled to an internal pneumatic cylinder that actuates axial movement of the cutting element; wherein the cutting element is coupled to an internal air motor that actuates rotational movement of the cutting element; wherein the internal pneumatic cylinder and the internal air motor are disposed in the second portion and do not traverse the second housing. The first portion may comprise a first sensor and the second portion may comprise a second sensor; wherein the first sensor and the second sensor sense when the first sensor is aligned with the second sensor. The wall sealing and penetrator apparatus may further comprise a temperature sensor in at least one of the first portion and the second portion. The wall sealing and penetrator apparatus may further comprise a control system in at least one of the first portion and the second portion. The wall sealing and penetrator apparatus may be usable during a drilling operation conducted at the drilling rig. The drilling rig may be an offshore rig.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of the various components and steps." Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for penetrating a wall, the method comprising:
   providing a wall sealing and penetrator apparatus comprising:
      a first portion comprising:
         a first housing,
         a first sealing element,
         a first vacuum port; and
      a second portion comprising,
         a second housing,
         a second sealing element,
         a second vacuum port, and
         a cutting element; wherein the first portion comprises a first sensor; wherein the second portion comprises a second sensor; wherein the first sensor and the second sensor sense when the first sensor is aligned with the second sensor;
   sealing the first portion on a first side of the wall by placing the first portion on the first side and removing air from a first internal space within the placed first portion with the first vacuum port, wherein the removal of air from the first internal space actuates the first sealing element to seal the first portion on the first side of the wall;

sealing the second portion on a second side of the wall by placing the second portion on the second side and removing air from a second internal space within the placed second portion with the second vacuum port, wherein the removal of air from the second internal space actuates the second sealing element to seal the second portion on the second side of the wall; and actuating the cutting element to cut the wall.

2. The method of claim 1, wherein the cutting element is a hole saw.

3. The method of claim 1, wherein the cutting element comprises a drill bit; wherein the cutting element is coupled to a drill via the drill bit, and the drill bit traverses the second housing; and wherein the drill is external to the second housing.

4. The method of claim 1, wherein the cutting element is coupled to a first internal motor that actuates axial movement of the cutting element; wherein the cutting element is coupled to a second internal motor that actuates rotational movement of the cutting element; wherein the first internal motor and the second internal motor are disposed in the second portion and do not traverse the second housing.

5. The method of claim 1, wherein the cutting element is coupled to an internal pneumatic cylinder that actuates axial movement of the cutting element; wherein the cutting element is coupled to an internal air motor that actuates rotational movement of the cutting element; wherein the internal pneumatic cylinder and the internal air motor are disposed in the second portion and do not traverse the second housing.

6. The method of claim 1, wherein the wall sealing and penetrator apparatus further comprises a temperature sensor in at least one of the first portion and the second portion.

7. The method of claim 1, wherein the wall sealing and penetrator apparatus further comprises a control system in at least one of the first portion and the second portion.

8. The method of claim 7, wherein the control system is capable of locking the cutting element.

9. The method of claim 7, wherein the control system is capable of reducing the axial and rotational movement of the cutting element.

10. The method of claim 7, wherein at least one of the first portion or the second portion comprises a vacuum removal port and wherein the control system is capable of locking the vacuum removal port.

11. The method of claim 7, wherein at least one of the first portion or the second portion comprises a cooling system and wherein the control system is capable of activating the cooling system.

12. The method of claim 1, wherein the wall is a wall on a drilling rig and wherein the method is performed during a drilling operation conducted at the drilling rig.

13. The method of claim 1, wherein the first housing comprises aluminum.

14. The method of claim 1, wherein the first housing comprises copper.

15. The method of claim 1, wherein the second housing comprises aluminum.

16. The method of claim 1, wherein the second housing comprises copper.

17. The method of claim 1, wherein at least one of the first portion or the second portion comprises a magnet.

18. The method of claim 1, wherein the cutting element is carbide-tipped hole saw.

19. The method of claim 1, wherein the cutting element comprises a threaded bit portion.

20. The method of claim 19, wherein the threading of the bit portion is threaded in a manner that syncs with threading of an internal gear such that rotation of internal gear induces axial movement of the cutting element.

* * * * *